United States Patent
Yamaguchi

(10) Patent No.: US 7,768,384 B2
(45) Date of Patent: Aug. 3, 2010

(54) POWER MANAGEMENT DEVICE AND COMPUTER READABLE MEDIUM

(75) Inventor: Kazuhi Yamaguchi, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 365 days.

(21) Appl. No.: 12/076,640

(22) Filed: Mar. 20, 2008

(65) Prior Publication Data
US 2008/0258895 A1   Oct. 23, 2008

(30) Foreign Application Priority Data
Apr. 19, 2007   (JP) .................. 2007-111063

(51) Int. Cl.
*B60C 23/00* (2006.01)
(52) U.S. Cl. .................. 340/455; 340/636.1; 340/637; 320/134; 320/165; 324/426
(58) Field of Classification Search ................. 340/455, 340/636.1–637; 320/134–165; 324/426
See application file for complete search history.

(56) References Cited

U.S. PATENT DOCUMENTS 6,621,250 B1 * 9/2003 Ohkubo et al. .............. 320/136

FOREIGN PATENT DOCUMENTS

JP   A 2004-147460   5/2004

* cited by examiner

*Primary Examiner*—Davetta W Goins
*Assistant Examiner*—Ojiako Nwugo
(74) *Attorney, Agent, or Firm*—Oliff & Berridge, PLC

(57) ABSTRACT

A power management device includes: a calculating unit that calculates the number of parking allowed days of a vehicle, based on information about the battery state and information about the current to be consumed by the vehicle while the vehicle is parked; an obtaining unit that obtains a response indicating the number of parking days from the user in reply to a notification of the number of parking allowed days; and a control unit that causes a notifying unit to notify the user of the number of parking allowed days calculated by the calculating unit, and prohibits an engine stop until the charge amount of the battery reaches the necessary charge amount through a charging operation, when a determining unit determines that the battery needs to be charged in accordance with the number of parking allowed days and the number of parking days obtained by the obtaining unit.

10 Claims, 13 Drawing Sheets

FIG. 3A

| DESTINATION | LONG TIME OR SHORT TIME | ESTIMATED UNATTENDED DAYS |
|---|---|---|
| AIRPORT | LONG TIME | 10 DAYS |
| SIGHTSEEING SPOT | LONG TIME | 2 DAYS |
| CONVENIENCE STORE | SHORT TIME | — |
| RESTAURANT | SHORT TIME | — |
| ⋮ | ⋮ | |

FIG. 3B

| PARKING PROHIBITED AREA |
|---|
| DESIGNATED AREA A1 UNDER REGULATION |
| DESIGNATED AREA A2 UNDER REGULATION |
| DESIGNATED AREA A3 UNDER REGULATION |
| IN FRONT OF FIRE STATION |
| INTERSECTION |
| ⋮ |

(WHEN THE BATTERY INTERNAL RESISTANCE IS 18 mΩ)

POWER MANAGEMENT DEVICE AND COMPUTER READABLE MEDIUM

BACKGROUND OF THE INVENTION

1. Field of the Invention

The present invention relates to a power management device and computer readable medium storing a program for effectively preventing the battery of a vehicle from running out while the vehicle is parked.

2. Description of the Related Art

Conventionally, to drive the electric components mounted on a vehicle, a battery for supplying power to the electric components and an alternator (a power generator) for charging the battery are also mounted on the vehicle. The power generating capacity of the alternator is determined in accordance with the state of the battery and the driving states of the electric components, and an engine. ECU (electronic control unit) notifies the alternator of the power generating capacity.

In recent years, the number of electric components mounted on each vehicle has been increasing, and this trend is expected to continue. Therefore, there is a demand for higher charge control precision or sophisticated charge control for preventing battery degradation.

One of the problems caused with the increase in the number of electric components is dark current. Dark current is the current to be consumed by the electric components while the engine is stopped. For example, an antitheft security device for cars has a large amount of dark current, mainly because such a device is in operation even when the engine is stopped. If the amount of dark current increases, the battery might deteriorate and run out.

To prevent such running out of a battery, Japanese Unexamined Patent Publication No. 2004-147460 discloses a technique by which the target value of the charge amount (SOC: state of charge) of the battery is determined in accordance with a destination that is set through a navigation device, and the battery is charged to achieve the target value of the charge amount (SOC) before the vehicle arrives at the destination.

However, the technique disclosed in Japanese Unexamined Patent Publication No. 2004-147460 has the problem of being unable to effectively prevent running out of the battery, because the target value of the charge amount might not be reached when there is a change in the traffic condition or the climate or when there is a change in the usage state of the electric components. Also, the target value of the charge amount is determined by predicting whether the vehicle is to be parked for a short period of time or a long period of time, based on the destination. However, there is no guarantee that the prediction is accurate, and the therefore, the problem of being unable to effectively prevent a battery from running out remains.

SUMMARY OF THE INVENTION

It is therefore an object of the present invention to provide a power management device and computer readable medium storing a program in which the above disadvantages are eliminated.

A more specific object of the present invention is to provide a power management device and computer readable medium storing a program for effectively preventing running out of the battery of a vehicle while the vehicle is parked.

According to an aspect of the present invention, there is provided a power management device including: a calculating unit that calculates the number of parking allowed days of a vehicle, based on information about a battery state and information about a current to be consumed by the vehicle while the vehicle is parked; an obtaining unit that obtains a response indicating the number of parking days of a user in reply to a notification of the number of parking allowed days; and a control unit that causes a notifying unit to notify the user of the number of parking allowed days calculated by the calculating unit, and prohibits an engine stop until a charge amount of the battery reaches a necessary charge amount through a charging operation, when a determining unit determines that the battery needs to be charged in accordance with the number of parking allowed days and the number of parking days obtained by the obtaining unit.

In the above structure, the number of parking allowed days of the vehicle is calculated based on the information about the battery state and the current to be consumed by the vehicle during the parking. If the determining unit determines that the battery needs to be charged in accordance with the number of parking allowed days and the number of parking days indicated in a response from the user, an engine stop is prohibited until the charge amount of the battery reaches the necessary charge amount through a charging operation. Accordingly, the battery state during an engine stop and the current to be consumed during the parking are taken into consideration, so as to effectively prevent the battery from running out during the parking.

BRIEF DESCRIPTION OF THE DRAWINGS

Other objects, features and advantages of the present invention will become more apparent from the following detailed description when read in conjunction with the accompanying drawings, in which:

FIGS. 3A and 3B show table information that is stored in the ROM of the power management device;

DESCRIPTION OF THE PREFERRED EMBODIMENTS

The following is a description of embodiments of the present invention, with reference to the accompanying drawings.

Figure 1:
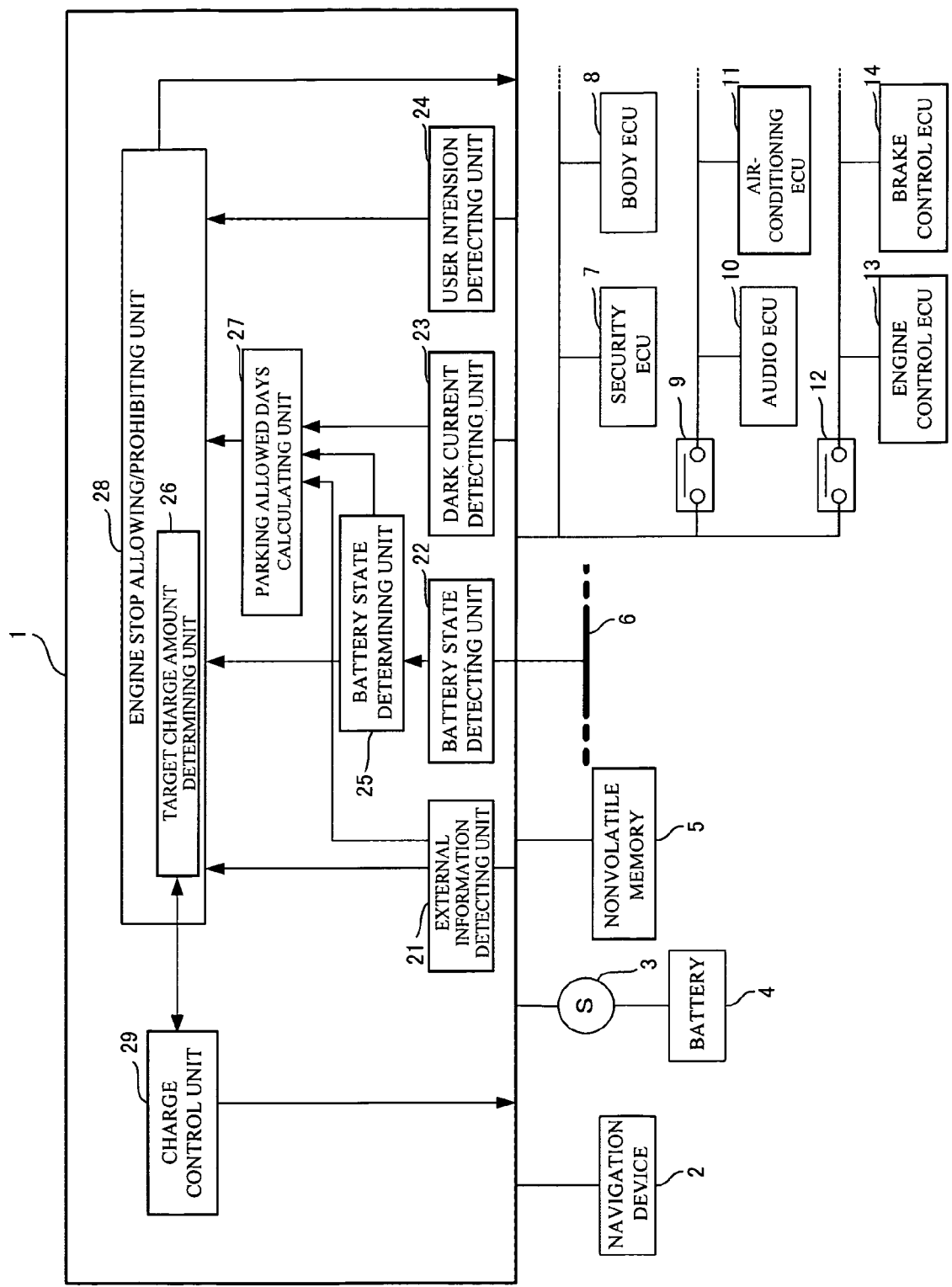
FIG. 1 is a block diagram schematically showing the structure of a vehicle-mounted system that includes a power management device of the present invention.

FIG. 1 is a block diagram schematically showing the structure of a vehicle-mounted system that includes a power management device.

In FIG. 1, the power management device 1 manages the power supply to a vehicle-mounted device. A navigation device 2 (the notifying unit), a set of sensors 3, a nonvolatile memory 5, a communication line 6, a security ECU (electronic control unit) 7, and a body ECU 8 (the sensing unit) are connected to the power management device 1. Further, a battery 4 is connected to the power management device 1 via the set of sensors 3, an audio ECU 10 and an air-conditioning ECU 11 are connected to the power management device 1 via a relay circuit 9 of an accessory switch, and an engine control ECU 13 and a brake control ECU 14 are connected to the power management device 1 via a relay circuit 12 of an ignition switch.

Figure 2:
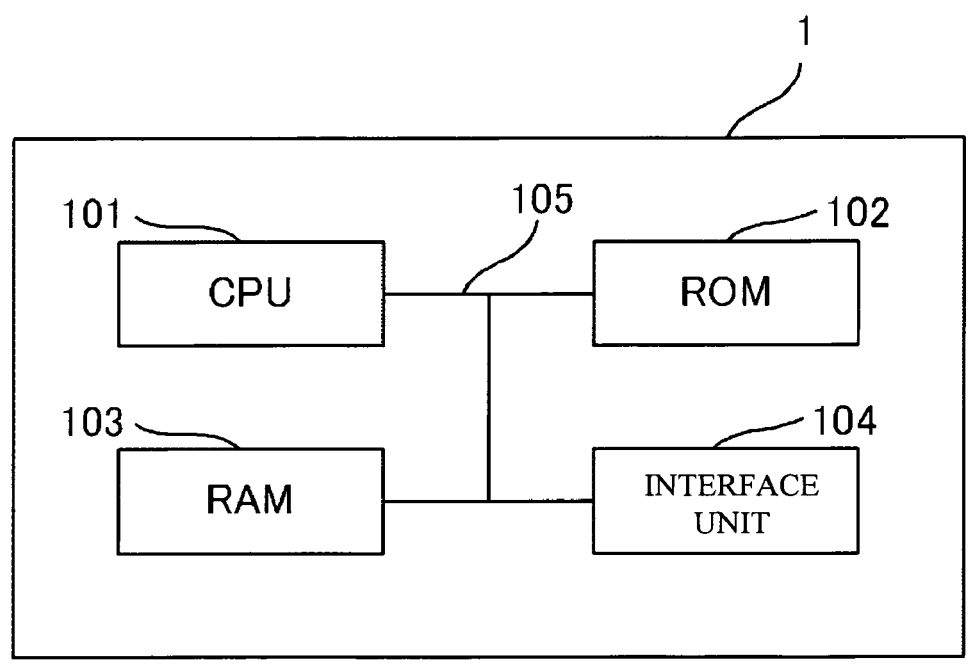
FIG. 2 is a block diagram showing the hardware structure of the power management device.
Figure 4:
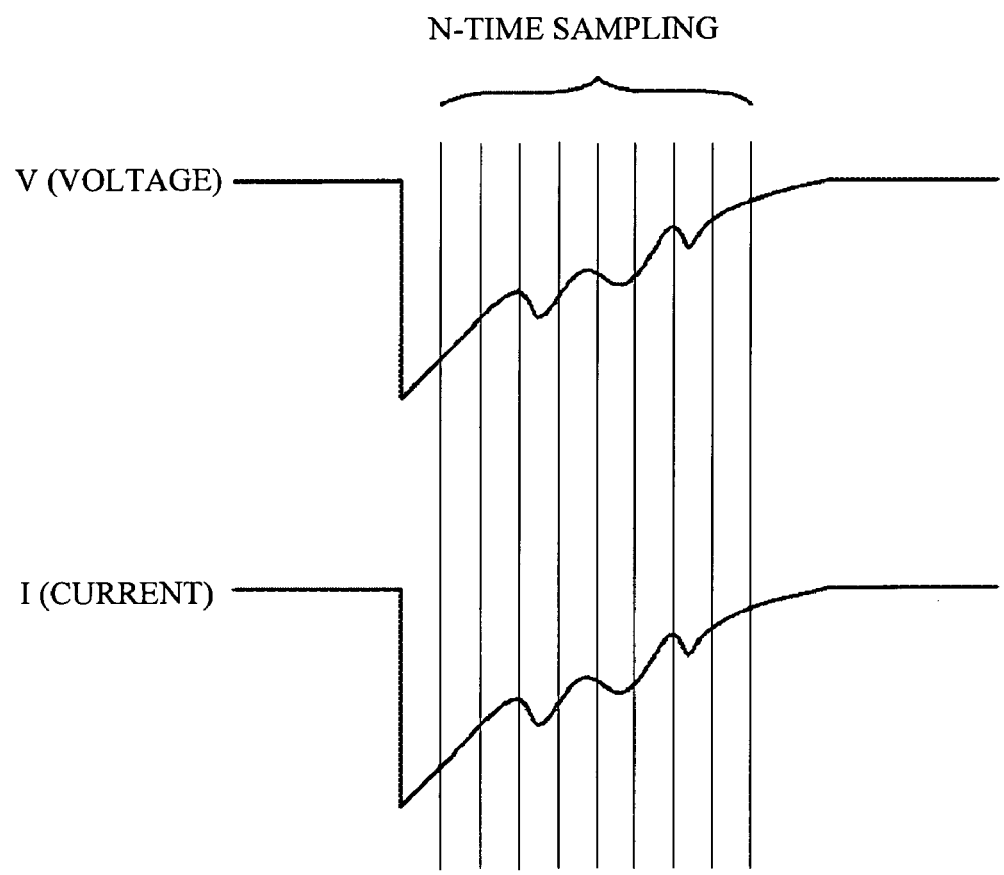
FIG. 4 shows a case where sampling is conducted on the voltage and current of a battery.

FIG. 2 is a block diagram showing the hardware structure of the power management device 1.

The power management device 1 may be formed with a microcomputer, for example. The power management device 1 includes: a CPU 101 that controls the entire device; a ROM 102 that stores a control program, maps (described later), and information; a RAM 103 that functions as a working area; and an interface unit 104 that is to be connected to an external device. The CPU 101 is connected to the ROM 102, the RAM 103, and the interface unit 104.

FIGS. 3A and 3B show the table information that is stored in the ROM 102. The table information shown in FIG. 3A indicates the relationship between a destination that is set with the navigation device 2, whether the parking time is long or short, and an estimated number of days during which the vehicle is to be left unattended. When a destination is set through the navigation device 2, the table information shown in FIG. 3A is used by the CPU 101 (more specifically, the later described engine stop allowing/prohibiting unit 28) to determine whether the parking time of the vehicle is long or short. The table information shown in FIG. 3A is also used by the CPU 101 (more specifically, the later described engine stop allowing/prohibiting unit 28) to estimate how many days the vehicle is to be left unattended, in accordance with the destination.

The table information shown in FIG. 3B is a list of parking prohibited areas. The table information is used by the CPU 101 (more specifically, the later described engine stop allowing/prohibiting unit 28) to determine whether to allow or prohibit an engine stop. When the vehicle is parked in one of the parking prohibited areas on the list, an engine stop is prohibited.

Referring back to FIG. 1, the navigation device 2 inputs a destination, the number of days of parking, and a forcible engine stop instruction, and displays the number of parking allowed days calculated by the power management device 1.

The set of sensors 3 include a voltage sensor that measures the voltage of the battery 4, a current sensor that measures the current of the battery 4, and a temperature sensor that measures the temperature of the battery liquid of the battery 4 (the temperature will be hereinafter referred to as the liquid temperature). The set of sensors 3 output the signals representing the voltage value, the current value, and the liquid temperature obtained by the sensors, to the power management device 1.

The nonvolatile memory 5 stores the information about the battery type of the battery 4, and the information about the dark current to be consumed by electric components while the engine is stopped. The battery type (Ah) is represented by the battery capacity (Asec)/3600 sec.

The communication line 6 serves to receive an input of a switch (not shown in the drawings) and is used to input and output communication data. The security ECU 7 receives signals from a vehicle steal preventing sensor (not shown in the drawings). The power to be supplied to this sensor is controlled by the power management device 1.

The body ECU 8 receives a signal indicating door opening or closing from a door curtain switch (not shown). When the accessory switch (not shown) is switched on, the relay circuit 9 is also switched on to supply power to the audio ECU 10 and the air conditioning ECU 11. Likewise, when the ignition switch is switched on, the relay circuit 12 is also switched on to supply power to the engine control ECU 13 and the brake control ECU 14.

The power management device 1 includes an external information detecting unit 21, a battery state detecting unit 22, a dark current detecting unit 23, a user intension detecting unit 24 (the input unit), a battery state determining unit 25, a parking allowed days calculating unit 27 (the calculating unit), the engine stop allowing/prohibiting unit 28 (the obtaining unit, the determining unit, the control unit, the correcting unit, and the sensing unit), and a charge control unit 29. The engine stop allowing/prohibiting unit 28 has a target charge amount (SOC (state of charge)) determining unit 26. The external information detecting unit 21, the battery state detecting unit 22, the dark current detecting unit 23, the user intension detecting unit 24, the battery state determining unit 25, the parking allowed days calculating unit 27, the engine stop allowing/prohibiting unit 28, and the charge control unit 29 are realized by the CPU 101 executing the control program stored in the ROM 102.

The external information detecting unit 21 obtains road information such as a destination and the location of the vehicle from the navigation device 2, and also obtains external information such as an input of a switch (not shown) and a communication data input from an external ECU (not shown) via the communication line 6.

The battery state detecting unit 22 obtains information indicating the voltage value, the current value, and the liquid temperature of the battery 4 measured during an engine stop from the set of sensors 3, and then transmits the information to the battery state determining unit 25. Alternatively, the battery state detecting unit 22 obtains information about the battery type stored beforehand in the nonvolatile memory 5, and then transmits the information to the battery state determining unit 25. In a case where the battery state determining unit 25 is to determine the battery type based on the battery capacity, it is not necessary to store the information about the battery type in the nonvolatile memory 5.

The dark current detecting unit 23 measures the dark current, based on the current value of the battery 4 measured while the engine is stopped (or while all the electric components are in a sleep state). It is also possible to store the value of the dark current in the nonvolatile memory 5 in advance, so that the dark current detecting unit 23 can obtain the value of the dark current from the nonvolatile memory 5.

The user intension detecting unit 24 obtains a response that is input by the user through the navigation device 2 or a switch (not shown) and indicates the number of days of parking. The user intension detecting unit 24 also detects an engine stop operation from the user (for example, a command to switch off the ignition switch or to force the engine to stop). The command to force the engine to stop is input to the user intension detecting unit 24 via the communication line 6 by the user pressing the switch (not shown).

The battery state determining unit 25 calculates the internal resistance of the battery 4, and determines the battery charging rate, based on the battery information (the information about the voltage value, the current value, and the liquid temperature) obtained from the battery state detecting unit 22. The battery state determining unit 25 also determines the battery type, based on the information about the battery obtained from the battery state detecting unit 22, or obtains the information about the battery type stored beforehand in the nonvolatile memory 5, from the battery state detecting unit 22. The information about the battery type is to be used for determining the battery charging rate.

The calculation of the internal resistance of the battery 4 based on the battery information (the information indicating the voltage value, the current value, and the liquid temperature) obtained from the battery state detecting unit 22 is now described.

In a case where there is a larger amount of discharge than a predetermined value at the time of a start of the engine, for example, the battery state determining unit 25 conducts sampling of current values and voltage values for a predetermined period of time (30 seconds, for example), and calculates the internal resistance of the battery 4 based on the results of the sampling. More specifically, the battery state determining unit 25 assigns the sampled current value and voltage value to Equation (1), so as to calculate the internal resistance of the battery 4:

$$Rn = \{(V1-(V0))/(I1-(I0))\} + \ldots + \{(Vn-(Vn-1))/(In-(In-1))\}/n \quad (1)$$

In Equation (1), the values each obtained by dividing the difference between the present voltage value and the previous voltage value by the difference between the present current value and the previous current value are added up one by one, and the total value is divided by the number of sampling times. In this manner, the mean value of the internal resistance is determined to obtain the accurate value of the internal resistance. The internal resistance of the battery 4 calculated in the above manner represents the so-called degradation level of the battery 4.

Next, the method of determining the battery type based on the battery information obtained from the battery state detecting unit 22 is described.

Figure 5:
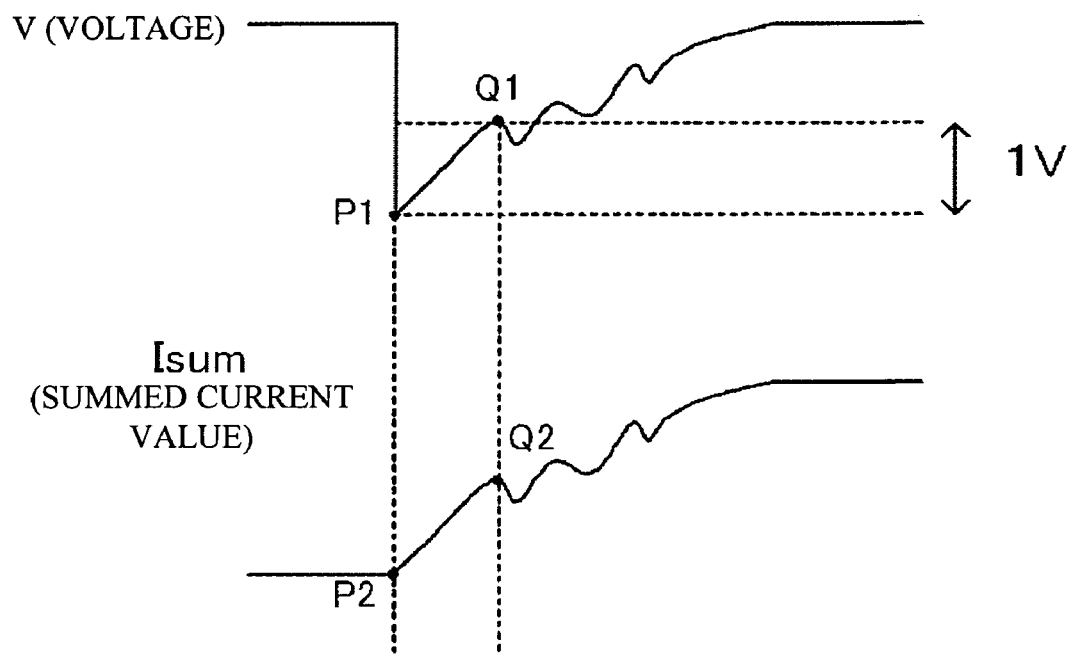
FIG. 5 shows the relationship between the voltage and the summed current value of the battery.

First, the battery state determining unit 25 adds up current values stored in the battery 4 until the voltage increases to 1 V. This is shown in FIG. 5. In FIG. 5, the voltage between point P1 and point Q1 is 1 V, and the summed current value Isum (Asec) corresponding to the voltage between point P1 and point Q1 is the value between point P2 and point Q2 shown in the lower half of the drawing. The summed current value Isum (Asec) is equivalent to the battery charge amount.

Figure 6:
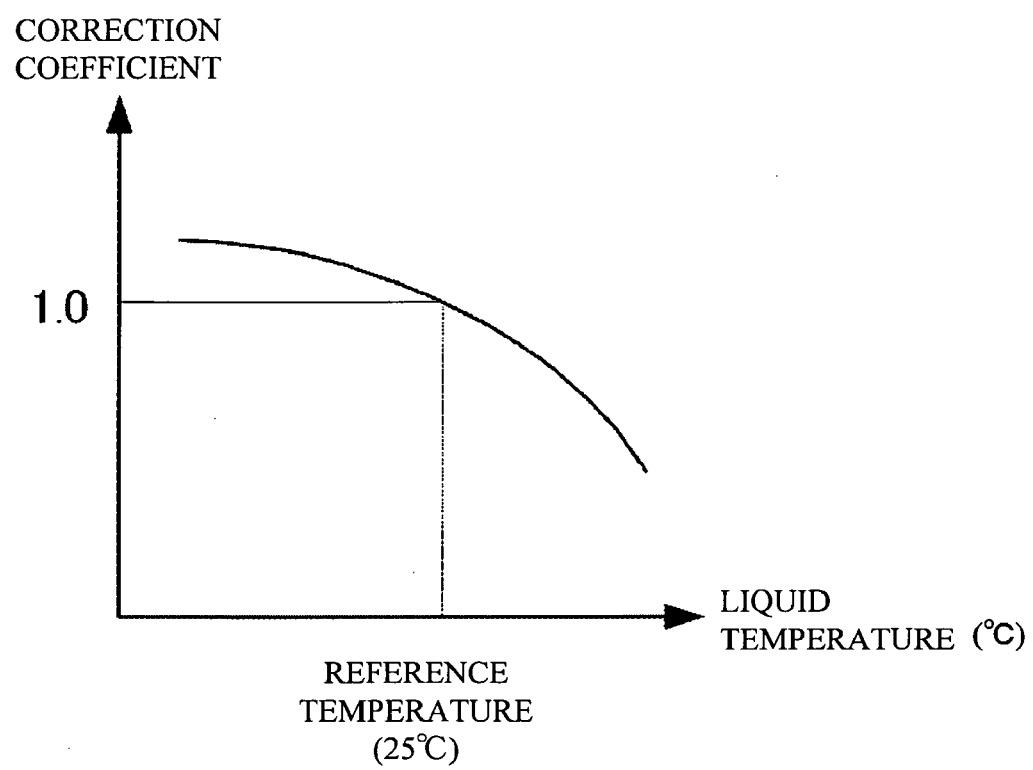
FIG. 6 shows an example of the map showing the relationship between the liquid temperature and a correction coefficient.

The battery state determining unit 25 then calculates a correction coefficient, based on the map showing the relationship between the liquid temperature and the correction coefficient shown in FIG. 6, and on the information about the liquid temperature obtained from the battery state detecting unit 22. The battery state determining unit 25 multiplies the summed current value Isum by the calculated correction coefficient. The map showing the relationship between the liquid temperature and the correction coefficient shown in FIG. 6 is stored beforehand in the ROM 102 of the power management device 1. After that, the battery state determining unit 25 divides the summed current value Isum, which has been multiplied by the correction coefficient, by 3600 sec. In this manner, the battery state determining unit 25 determines the battery type (Ah).

Next, the method of determining the charging rate of the battery 4 is described.

First, the battery state determining unit 25 calculates the open voltage (Vopen) of the battery 4 in accordance with Equation (2). The open voltage is the voltage observed when the GND terminal of the battery 4 is opened.

$$V\text{open} = V\text{now} - (I\text{now} \times R) \quad (2)$$

In Equation (2), Vnow represents the voltage value that is obtained presently as a result of sampling, Inow represents the current value that is obtained presently as a result of sampling, and R represents the above described internal resistance of the battery. The value of Inow is a positive value at the time of charging, and is a negative value at the time of discharging.

The battery state determining unit 25 then determines the battery type (Ah) by the above described method. In a case where the information about the battery type stored beforehand in the nonvolatile memory 5 can be obtained from the battery state detecting unit 22, the battery state determining unit 25 uses the information about the battery type, and does not determine the battery type (Ah) by the above described method.

Figure 7A:
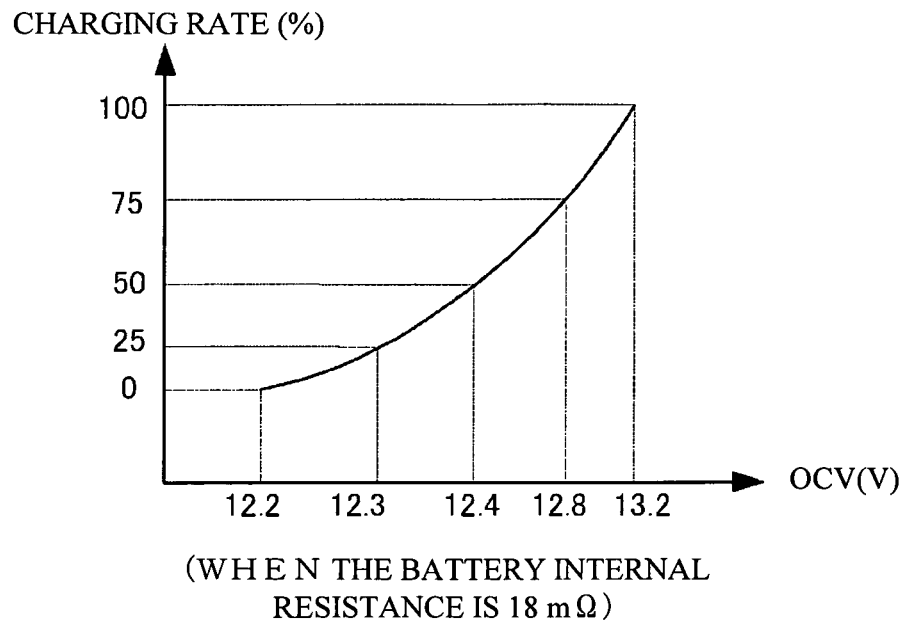
FIG. 7A shows an example of the map that defines the relationship between the charging rate and open voltage.

The battery state determining unit 25 next reads the map (shown in FIG. 7A) defining the relationship between the charging rate and the open voltage (OCV) corresponding to the battery type (Ah) from the ROM 102 of the power management device 1. The map defining the relationship between the charging rate and the open voltage is stored with respect to each battery type (Ah) in the ROM 102 of the power management device 1. The battery state determining unit 25 then calculates the charging rate of the battery 4, based on the map defining the relationship between the charging rate and the open voltage, and on the calculated open voltage. FIG. 7A shows an example of the map defining the relationship between the charging rage and the open voltage that are observed when the battery internal resistance is 18 mΩ.

Figure 7B:
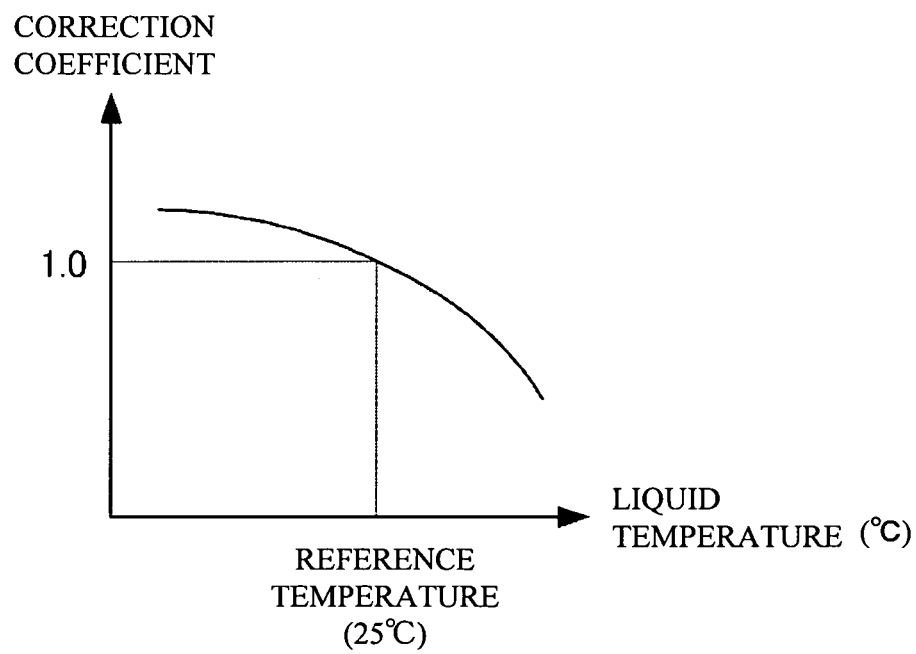
FIG. 7B shows an example of the charging rate correction map to be used for correcting the charging rate.

Using a charging rate correction map (shown in FIG. 7B) that is stored in the ROM 102 and is to be used for correcting a charging rate, the battery state determining unit 25 may calculate a correction coefficient from the information about the liquid temperature, and multiply the calculated charging rate of the battery 4 by the correction coefficient, so as to determine the definite charging rate of the battery 4.

The target charge amount determining unit 26 provided in the engine stop allowing/prohibiting unit 28 determines whether the vehicle is to be left for a short period of time or a long period of time at the destination, based on the destination information that is input through the navigation device 2 and the external information detecting unit 21. For example, if the destination of the vehicle is an airport or a sightseeing spot, the target charge amount determining unit 26 determines that the vehicle is to be left for a long period of time. If the destination of the vehicle is a convenience store or a restaurant, the target charge amount determining unit 26 determines that the vehicle is to be left for a short period of time.

When determining that the vehicle is to be left for a long period of time, the target charge amount determining unit 26 sets the target charge amount in the neighborhood of the full charge amount (a charging rate of 96%, for example), and outputs a charge instruction including the target charging rate to the charge control unit 29. The charge control unit 29 receives the charge instruction, and starts charging the battery 4.

Figure 8:
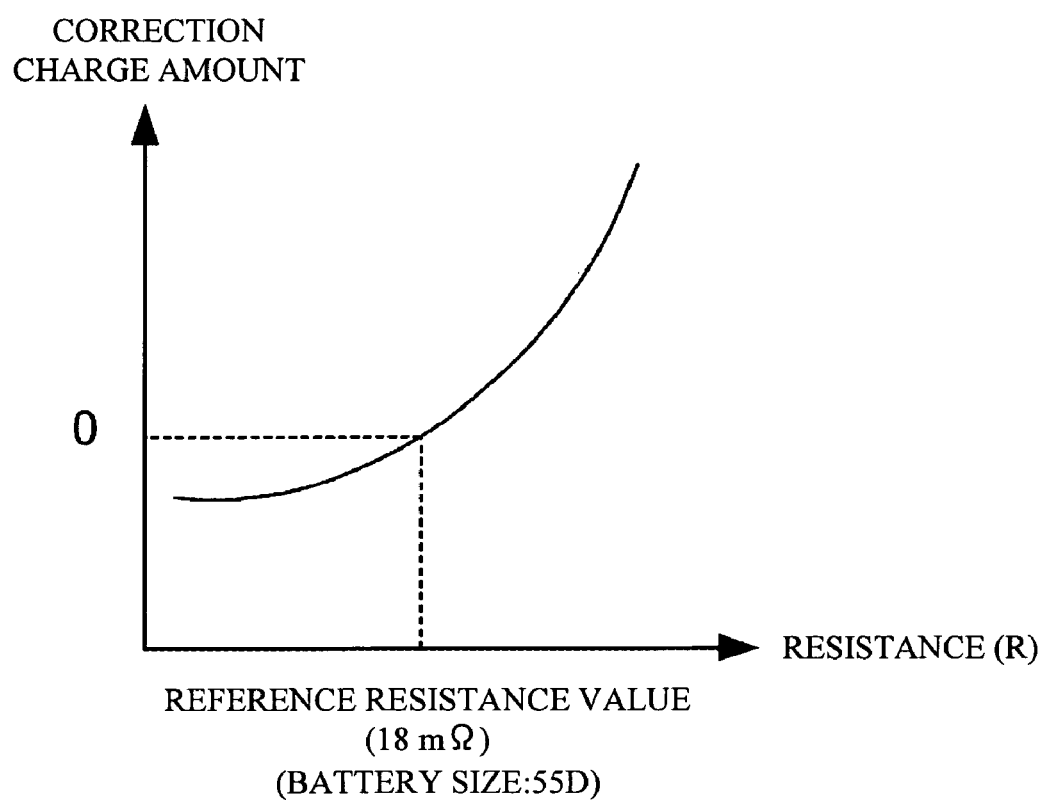
FIG. 8 shows an example of the map that defines the relationship between the correction charge amount to be used for correcting the target charge amount and the internal resistance.

When determining that the vehicle is to be left for a short period of time, the target charge amount determining unit 26 determines that the target charge amount is the reference charging rate (a charging rate of 92%, for example), and outputs a charge instruction including the target charge amount to the charge control unit 29. At this point, the target charge amount determining unit 26 reads the map shown in FIG. 8 that defines the relationship between a correction charge amount to be used for correcting the target charge amount and the internal resistance, from the ROM 102 of the power management device 1. Based on the read map and the information about the internal resistance calculated by the battery state determining unit 25, the target charge amount determining unit 26 calculates a correction charge amount. The target charge amount determining unit 26 then adds the correction charge amount to the above determined target charge amount, so as to determine the definite target charge amount. In this manner, the internal resistance of the battery or the degradation level of the battery can be taken into consideration in the determination of the target charge amount. The reference resistance value of 18 mΩ in FIG. 8 is a value that is observed in a case where the battery size is 55D.

When there is an engine stop operation (or when the ignition switch is turned off), the parking allowed days calculating unit 27 obtains the information about the battery type and the charging rate from the battery state determining unit 25, and the information about the dark current from the dark current detecting unit 23. Based on the obtained information about the battery type, the charging rate, and the dark current, the parking allowed days calculating unit 27 calculates the number of parking allowed days.

More specifically, the parking allowed days calculating unit 27 calculates the number of parking allowed days in accordance with Equations (3) through (5), using the obtained information about the battery type, the charging rate, and the dark current:

$$\text{Dischargeable power} = (\text{present charging rate} - \text{charging rate at discharge end})/100 \times \text{battery capacity } (A\text{sec}) \quad (3)$$

$$\text{Leaving allowed period of time (sec)} = \text{dischargeable power}/\text{dark current} \quad (4)$$

$$\text{Number of parking allowed days} = \text{leaving allowed period of time}/86400 \text{ (sec)} \quad (5)$$

Here, the information about the charging rate obtained from the battery state determining unit 25 is assigned to the present charging rate in Equation (3). The "charging rate at discharge end" is the charging rate necessary for starting the engine, and may be 30%, for example. The value obtained by multiplying the value of the battery type obtained from the battery state determining unit 25 by 3600 sec is assigned to the battery capacity in Equation (3). In this manner, the dischargeable power is calculated with the use of Equation (3). The parking allowed days calculating unit 27 divides the dischargeable power by the value of the dark current obtained from the dark current detecting unit 23 (the dark current per 1 sec), and calculates the leaving allowed period of time in Equation (4). The parking allowed days calculating unit 27 then divides the leaving allowed period of time calculated in accordance with Equation (4) by 86400 (sec), which is one day (24 hours) represented in terms of seconds. In this manner, the parking allowed days calculating unit 27 calculates the number of parking allowed days.

Figure 9A:
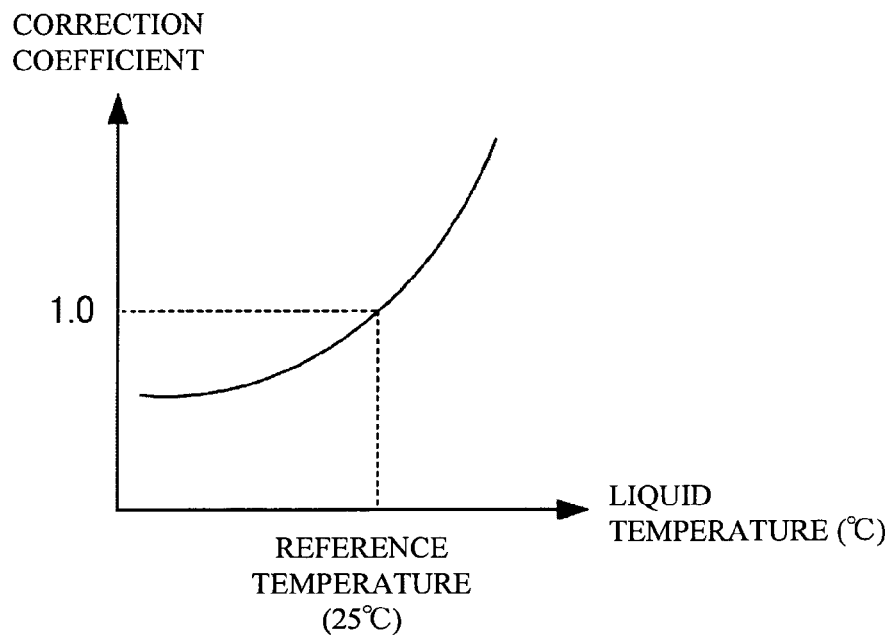
FIG. 9A shows an example of the map that defines the relationship between the liquid temperature and a correction coefficient.

Since a decrease or an increase is caused in the liquid temperature of the battery 4 depending on the climate, the value obtained by multiplying the dischargeable power calculated according to Equation (3) by a correction coefficient may be set as the definite dischargeable power. In such a case, the parking allowed days calculating unit 27 obtains the information about the liquid temperature from the battery state determining unit 25, and reads the map defining the relationship between the liquid temperature and the correction coefficient as shown in FIG. 9A from the ROM 102 of the power management device 1. Based on the read map and the information about the liquid temperature obtained from the battery state determining unit 25, the parking allowed days calculating unit 27 calculates the correction coefficient.

Figure 9B:
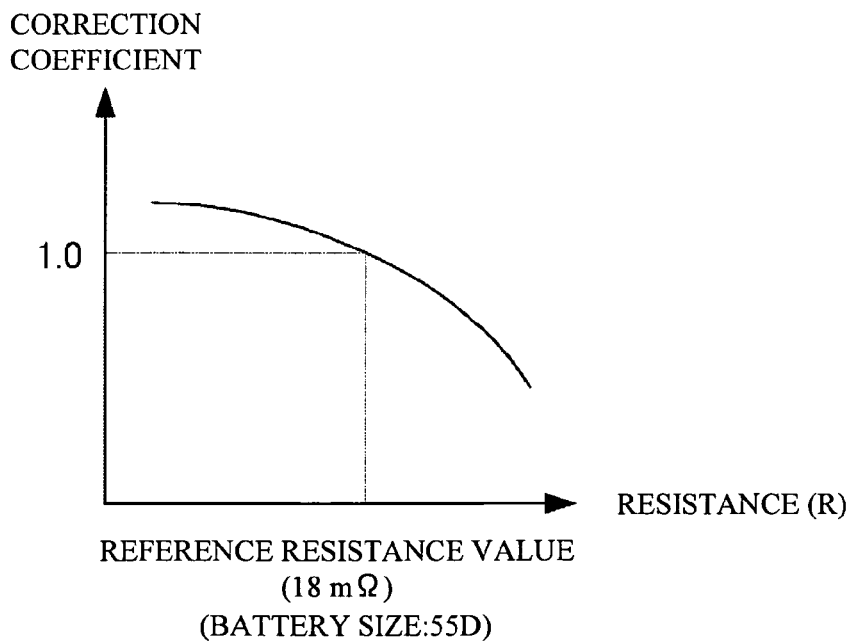
FIG. 9B shows an example of the map that defines the relationship between the internal resistance and a correction coefficient.

Alternatively, the value obtained by multiplying the dischargeable power calculated according to Equation (3) by a correction coefficient reflecting the internal resistance (or the degradation level of the battery 4) may be set as the definite dischargeable power. In such a case, the parking allowed days calculating unit 27 obtains the information about the internal resistance from the battery state determining unit 25, and reads the map defining the relationship between the internal resistance and the correction coefficient as shown in FIG. 9B from the ROM 102 of the power management device 1. Based on the read map and the information about the internal resistance obtained from the battery state determining unit 25, the parking allowed days calculating unit 27 calculates the correction coefficient. The reference resistance value of 18 mΩ in FIG. 9B is the value obtained in a case where the battery size is 55D.

When a destination is set through the navigation device 2, the engine stop allowing/prohibiting unit 28 determines whether the vehicle is to be parked for a long period of time or a short period of time, based on the destination and the table information shown in FIG. 3A. Based on the information about the vehicle location obtained from the navigation device 2 and the table information shown in FIG. 3B, the engine stop allowing/prohibiting unit 28 also determines whether the location of the vehicle is in a parking prohibited area, and according to the determination result, further determines whether to allow the engine control ECU 13 to stop the engine or to prohibit the engine control ECU 13 from stopping the engine. If the location of the vehicle is in a parking prohibited area, the engine stop allowing/prohibiting unit 28 prohibits the engine control ECU 13 from stopping the engine.

The engine stop allowing/prohibiting unit 28 also obtains the parking allowed days calculated by the parking allowed days calculating unit 27, and notifies the user of the parking allowed days via the navigation device 2. The engine stop allowing/prohibiting unit 28 then receives a response about the number of parking days from the user in reply to notification of the parking allowed days via the navigation device 2 and the user intention detecting unit 24. The engine stop allowing/prohibiting unit 28 further obtains the information about an engine stop operation of the user (such as an operation of turning off the ignition switch or a command to force an engine stop) via the user intention detecting unit 24.

The engine stop allowing/prohibiting unit 28 further compares the number of parking days indicated in the response from the user with the number of parking allowed days calculated by the parking allowed days calculating unit 27. If the number of parking allowed days is larger than the number of parking days indicated in the response from the user, the engine stop allowing/prohibiting unit 28 allows the engine control ECU 13 to stop the engine. If the number of parking allowed days is not larger than the number of parking days indicated in the response from the user, the engine stop allowing/prohibiting unit 28 prohibits the engine control ECU 13 from stopping the engine until the shortage in the electric quantity (or the necessary charge amount) of the battery 4 is compensated for.

The necessary charge amount is calculated by the target charge amount determining unit 26 in the engine stop allowing/prohibiting unit 28 in accordance with the following Equation (6):

$$\text{Necessary charge amount} = (\text{parking days notified by user} - \text{parking allowed days}) \times 86400 \text{ (sec)} \times \text{dark current} \quad (6)$$

Here, the value obtained through the navigation device 2 and the user intention detecting unit 24 is assigned to the "parking days notified by user" in Equation (6). The value obtained from the parking allowed days calculating unit 27 is assigned to the "parking allowed days" in Equation (6). The "dark current" is the current value per unit time (one second), and the value obtained from the dark current detecting unit 23 via the parking allowed days calculating unit 27 is assigned to the "dark current". In this manner, the necessary charge amount is calculated.

Figure 10A:
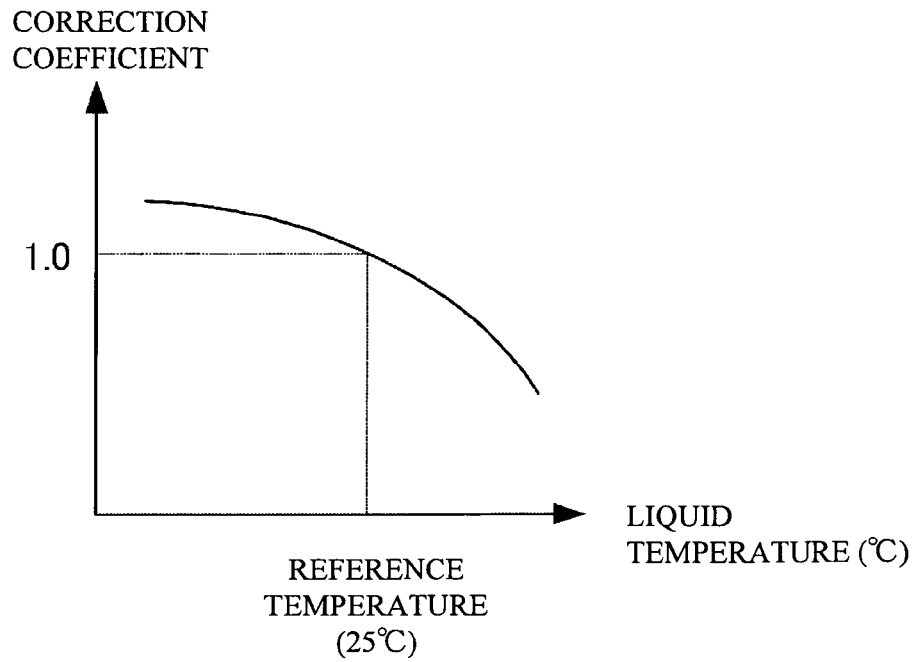
FIG. 10A shows an example of the map that defines the relationship between the liquid temperature and a correction coefficient.

Since a decrease or an increase is caused in the liquid temperature of the battery 4 depending on the climate, the value obtained by multiplying the necessary charge amount calculated according to Equation (6) by a correction coefficient may be set as the definite necessary charge amount. In such a case, the target charge amount determining unit 26 obtains the information about the liquid temperature from the battery state determining unit 25, and reads the map defining the relationship between the liquid temperature and the correction coefficient as shown in FIG. 10A from the ROM 102 of the power management device 1. Based on the read map and the information about the liquid temperature obtained from the battery state determining unit 25, the target charge amount determining unit 26 calculates the correction coefficient.

Figure 10B:
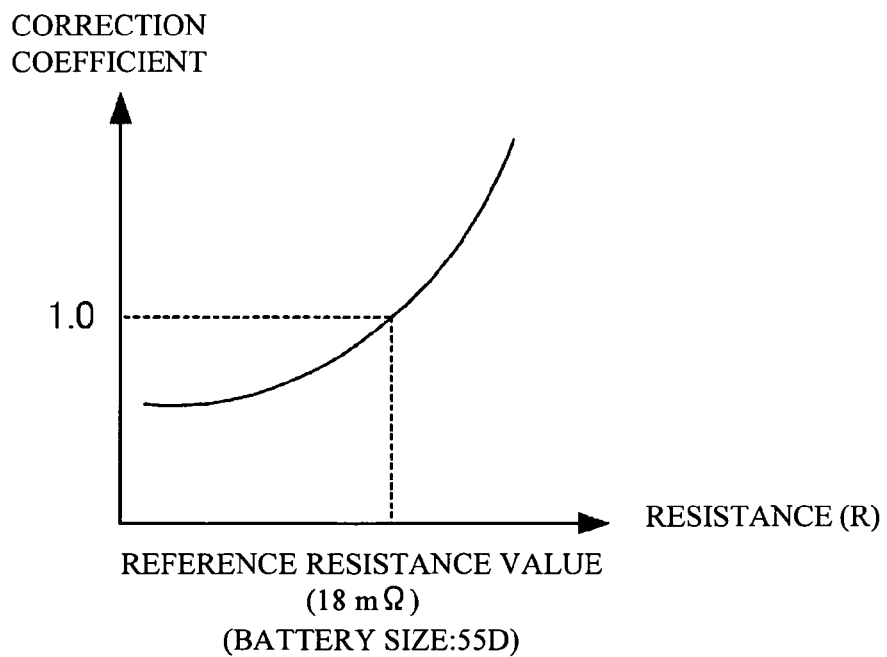
FIG. 10B shows an example of the map that defines the relationship between the internal resistance and a correction coefficient.

Alternatively, the value obtained by multiplying the necessary charge amount calculated according to Equation (6) by a correction coefficient reflecting the internal resistance (or the degradation level of the battery 4) may be set as the definite necessary charge amount. In such a case, the target charge amount determining unit 26 obtains the information about the internal resistance from the battery state determining unit 25, and reads the map defining the relationship between the internal resistance and the correction coefficient as shown in FIG. 10B from the ROM 102 of the power management device 1. Based on the read map and the information about the internal resistance obtained from the battery state determining unit 25, the target charge amount determining unit 26 calculates the correction coefficient. The reference resistance value of 18 mΩ in FIG. 10B is the value obtained in a case where the battery size is 55D.

Figure 11:
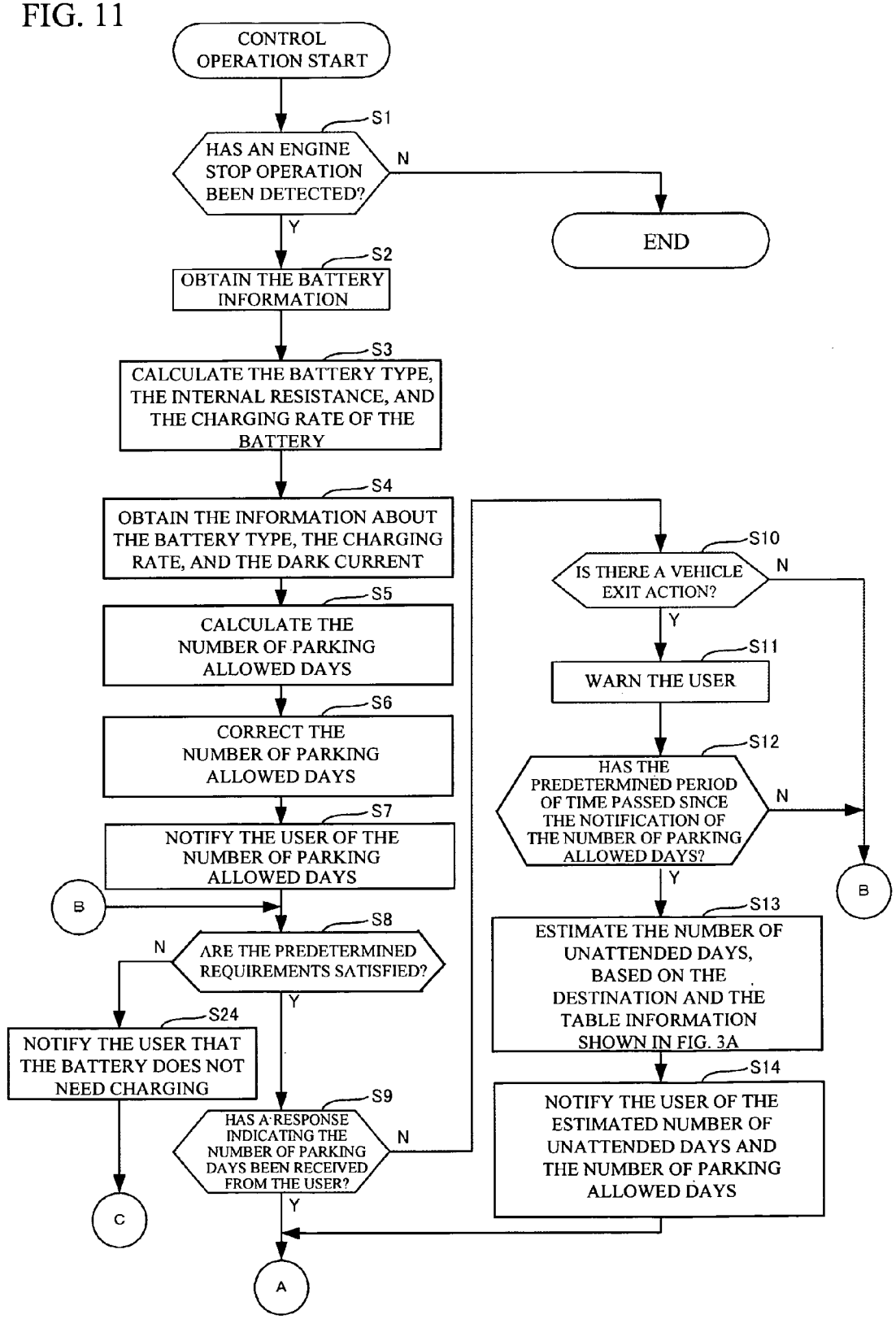
FIG. 11 is a flowchart showing a control operation to be performed by the power management device.
Figure 12:
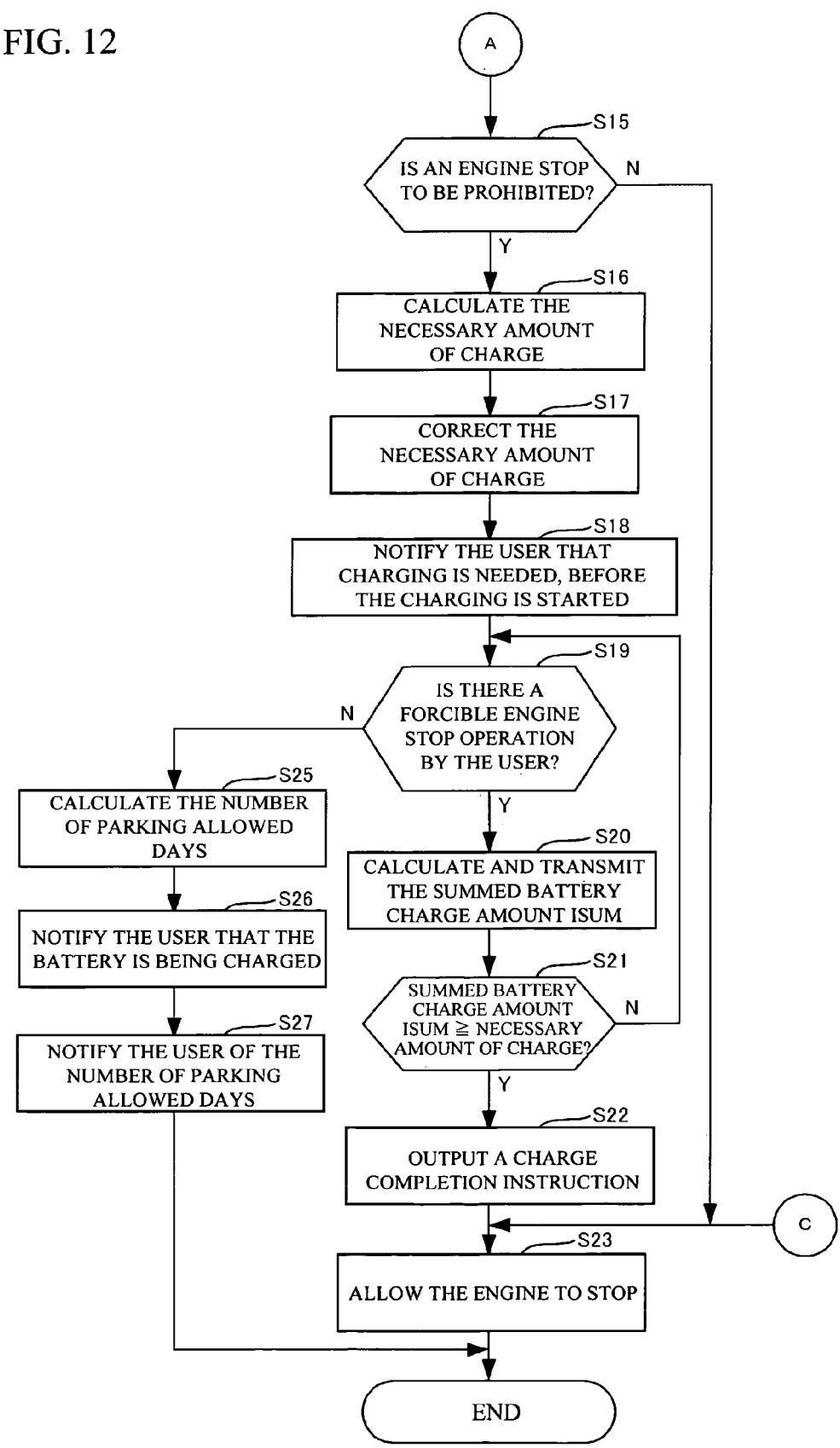
FIG. 12 is a flowchart showing the control operation to be performed by the power management device.

FIGS. 11 and 12 are flowcharts showing a control operation to be performed by the power management device 1.

First, the user intension detecting unit 24 determines whether an engine stop operation (such as an operation of turning off the ignition switch) by the user has been detected (step S1). If the user intension detecting unit 24 does not detect an engine stop operation by the user, this operation comes to an end. If the user intension detecting unit 24 detects an engine stop operation by the user, the battery state detecting unit 22 obtains the information about the battery 4 (the information about the voltage value, the current value, and the liquid temperature of the battery 4) from the set of sensors 3, and transmits the information to the battery state determining unit 25 (step S2).

Based on the obtained information about the battery 4, the battery state determining unit 25 calculates the battery type, the internal resistance, and the charging rate of the battery 4 in the above described manners (step S3). If the information about the battery type is stored in the nonvolatile memory 5 in advance, the battery state determining unit 25 may obtain the information from the nonvolatile memory 5.

The parking allowed days calculating unit 27 obtains the information about the battery type and the charging rate from the battery state determining unit 25, and the information about the dark current from the dark current detecting unit 23 (step S4). Based on the obtained information about the battery type, the charging rate, and the dark current, the parking allowed days calculating unit 27 calculates the parking allowed days (step S5).

Based on the map shown in FIG. 9A and the information about the liquid temperature obtained from the battery state determining unit 25, the parking allowed days calculating unit 27 calculates a correction coefficient. Alternatively, based on the map shown in FIG. 9B and the information about the internal resistance obtained from the battery state determining unit 25, the parking allowed days calculating unit 27 calculates a correction coefficient. The parking allowed days calculating unit 27 multiplies the parking allowed days calculated in step S5 by the correction coefficient, so as to correct the number of parking allowed days (step S6).

The engine stop allowing/prohibiting unit 28 obtains the number of parking allowed days calculated by the parking allowed days calculating unit 27, and notifies the user of the number of parking allowed days via the navigation device 2 (step S7).

The engine stop allowing/prohibiting unit 28 then determines whether predetermined requirements are satisfied (step S8).

The predetermined requirements are: (1) the engine stop allowing/prohibiting unit 28 determines that the vehicle is to be parked for a long period of time, based on the destination set through the navigation device 2 and the table information shown in FIG. 3A; (2) the engine stop allowing/prohibiting unit 28 determines that the location of the vehicle is not in a parking prohibited area, based on the information about the vehicle location obtained through the navigation device 2 and the table information shown in FIG. 3B; and (3) the engine stop allowing/prohibiting unit 28 does not receive a command to force an engine stop via the user intention detecting unit 24.

When determining that even one of the above three requirements is not satisfied, the engine stop allowing/prohibiting unit 28 notifies the user that the battery 4 does not need charging with the use of a display on the navigation device 2 or a voice from an in-vehicle speaker (not shown in the drawings) (step S24), and moves on to step S23. Otherwise, the operation moves on to step S9.

The engine stop allowing/prohibiting unit 28 then determines whether a response indicating the number of parking days has been received from the user in reply to the notification of the number of parking allowed days via the navigation device 2 and the user intention detecting unit 24 (step S9).

In a case where a response indicating the number of parking days has not been received, the engine stop allowing/prohibiting unit 28 determines whether there has been a vehicle exit action by the user (step S10). Whether there has been a vehicle exit action by the user is determined based on whether a signal indicating "door open" has been received from the body ECU 8. In a case where a signal indicating "door open" has been received from the body ECU 8, the engine stop allowing/prohibiting unit 28 determines that there has been a vehicle exit action by the user.

In a case where there has not been a vehicle exit action by the user, the operation returns to step S8. In a case where there has been a vehicle exit action by the user, the engine stop allowing/prohibiting unit 28 warns the user with the use of a display on the navigation device 2 or a voice from an in-vehicle speaker (not shown in the drawings) (step S11). This warning is issued to notify the user that the charging of the battery 4 has not been completed.

After notifying the user of the number of parking allowed days in step S7, the engine stop allowing/prohibiting unit 28 determines whether a predetermined period of time (30 seconds, for example) has passed (step S12). In a case where the predetermined period of time has not passed, the operation returns to step S8. In a case where the predetermined period of time has passed, the engine stop allowing/prohibiting unit 28 estimates the number of days during which the vehicle is to be left unattended (hereinafter referred to as the estimated number of unattended days), based on the destination set through the navigation device 2 and the table information shown in FIG. 3A (step S13). The engine stop allowing/prohibiting unit 28 then notifies the user of the estimated number of unattended days and the number of parking allowed days obtained in step S7 (step S14), and moves on to step S15.

Based on the number of parking allowed days obtained in step S7 and the response indicating the parking days from the user, or on the estimated number of unattended days and the number of parking allowed days, the engine stop allowing/prohibiting unit 28 determines whether to prohibit the engine control ECU 13 from stopping the engine (step S15). More specifically, in a case where the number of parking allowed days is not larger than the number of parking days sent as a reply from the user or the estimated number of unattended days, the engine stop allowing/prohibiting unit 28 prohibits the engine control ECU 13 from stopping the engine.

In a case where the engine stop allowing/prohibiting unit 28 determines to prohibit an engine stop in step S15, the target charge amount determining unit 26 calculates the necessary charge amount in accordance with the above Equation (6) (step S16).

The target charge amount determining unit 26 also calculates a correction coefficient based on the map shown in FIG. 10A and the information about the liquid temperature obtained from the battery state determining unit 25, or calculates a correction coefficient based on the map shown in FIG. 10B and the information about the internal resistance obtained from the battery state determining unit 25. The target charge amount determining unit 26 then multiplies the necessary charge amount calculated in step S16 by the correction coefficient, so as to correct the necessary charge amount (step S17).

The target charge amount determining unit 26 outputs a charge instruction including the corrected necessary charge amount to the charge control unit 29. Upon receipt of the charge instruction, the charge control unit 29 starts charging the battery 4 (step S18). Here, the engine stop allowing/prohibiting unit 28 notifies the user that the battery 4 needs to be charged, through a display on the navigation device 2 or a voice from an in-vehicle speaker (not shown in the drawings) (step S18).

The user intension detecting unit 24 then determines whether there has been a forcible engine stop operation (such as an operation of turning off the ignition switch) by the user (step S19). In a case where the user intension detecting unit 24 has not detected a forcible engine stop operation by the user, the operation moves on to step S20.

When the charging of the battery 4 is started, the battery state determining unit 25 calculates the summed battery charge amount Isum, based on the information about the current obtained from the set of sensors 3 via the battery state detecting unit 22. The battery state determining unit 25 then transmits the information about the battery charge amount Isum to the target charge amount determining unit 26 whenever appropriate (step S20).

The target charge amount determining unit 26 determines whether the battery charge amount Isum is equal to or larger than the necessary charge amount corrected in step S17 (step S21). In a case where the battery charge amount Isum is smaller than the necessary charge amount, the operation returns to step S19. In a case where the battery charge amount Isum is equal to or larger than the necessary charge amount, the target charge amount determining unit 26 outputs a charge completion notice to the charge control unit 29 (step S22). Upon receipt of the charge completion notice, the charge control unit 29 ends the charging of the battery 4.

The engine stop allowing/prohibiting unit 28 then allows the engine control ECU 13 to stop the engine (step S23), and this operation comes to an end.

In a case where the user intension detecting unit 24 detects a forcible engine stop operation by the user in step S19, the parking allowed days calculating unit 27 obtains the information about the battery type and the charging rate from the battery state determining unit 25, and the information about the dark current from the dark current detecting unit 23. Based on the obtained information about the battery type, the charging rate, and the dark current, the parking allowed days calculating unit 27 calculates the number of parking allowed days (step S25).

The engine stop allowing/prohibiting unit 28 notifies the user via the navigation device 2 that the battery 4 is being charged (step S26). The engine stop allowing/prohibiting unit 28 then obtains the number of parking allowed days calculated by the parking allowed days calculating unit 27 in step S25, and notifies the user of the number of parking allowed days via the navigation device 2 (step S27). This operation then comes to an end.

As described above in detail, in accordance with this embodiment, the number of parking days allowed for the vehicle is calculated based on the information about the battery state and the dark current to be consumed by the vehicle. When the device determines that the battery needs to be charged in accordance with the number of parking allowed days and the number of parking days indicated in a response from the user, an engine stop is prohibited until the battery reaches the necessary charge amount through a charging operation (step SS5, steps S15 through 21). Accordingly, the battery state and the dark current to be consumed by the vehicle are taken into consideration to effectively prevent the battery from running out during the parking.

The necessary charge amount is calculated by the control unit subtracting the number of parking allowed days from the number of parking days indicated in a response from the user, and multiplying the subtraction result by 86400 (seconds) and the dark current per unit time (one second). The information about the battery state includes the internal resistance, capacity, and charging rate of the battery.

Based on the liquid temperature or the internal resistance of the battery, the calculated number of parking allowed days is corrected (step S6). Accordingly, the number of parking allowed days can be more accurately calculated.

The user is notified of the calculated number of parking allowed days and whether the battery needs to be charged, when the engine is stopped by turning of the ignition switch (step S7, step S18). Accordingly, the user can recognize the number of parking allowed days and whether the battery needs to be charged, when the engine is stopped by turning off the ignition switch.

The device then determines whether the vehicle is to be parked for a short period of time or a long period of time, in accordance with the destination of the vehicle (step S8). If the device determines that the vehicle is to be parked for a short period of time, an engine stop is allowed ("NO" in step S8). If the device determines that the vehicle is to be parked for a long period of time, an engine stop is prohibited, so as to charge the battery ("YES" in step S8). Accordingly, higher user-friendliness can be achieved.

Also, in parking prohibited areas, an engine stop is automatically prohibited ("YES" in step S8). Accordingly, higher user-friendliness can be achieved.

A command to force an engine stop can be input to the user intension detecting unit 24 via the communication line 6 by the user pressing a switch (not shown in the drawings), and an engine stop is allowed accordingly ("NO" in step S8). Thus, the user's intension to stop the engine is respected.

In a case where a vehicle exit action is sensed after the user is notified of the number of parking allowed days, a warning is sent to the user (steps S9 through S11). Accordingly, the user can be notified that the charging of the battery has not been completed.

In a case where a response indicating the number of parking days is not received from the user in reply to the notification of the number of parking allowed days, and a vehicle exit action is detected, the device estimates the number of unattended days in accordance with the destination of the vehicle, and the device determines whether the battery needs to be charged in accordance with the number of parking allowed days and the estimated number of unattended days. If the device determines that the batter needs to be charged, an engine stop is prohibited until the battery reaches the necessary charge amount through a charging operation (steps S9 through S21). Thus, even if the user exits the vehicle without a response indicating the number of parking days, the necessary charging of the battery can be performed.

Figure 13:
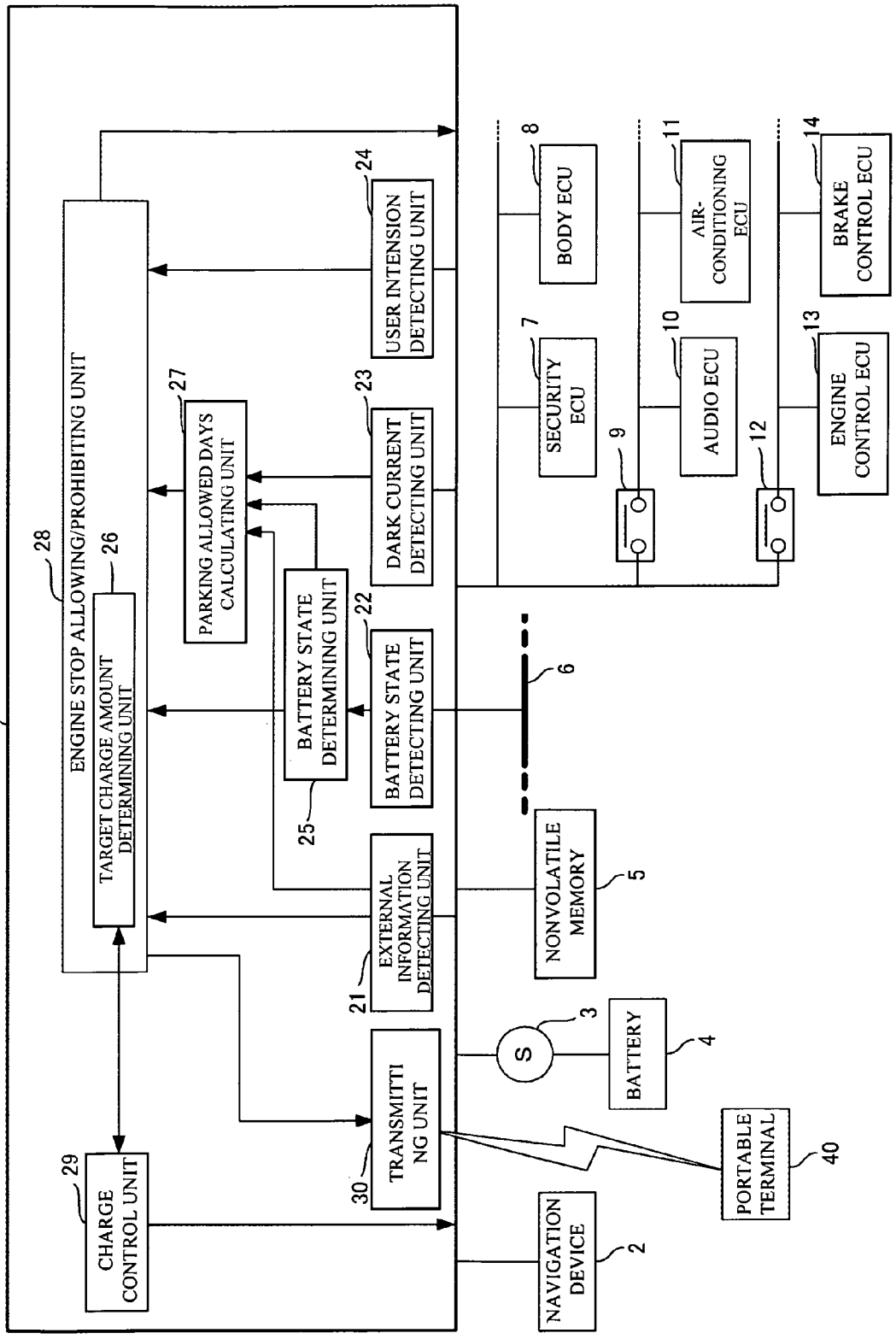
FIG. 13 is a block diagram schematically showing the structure of a vehicle-mounted system that includes a modification of the power management system of FIG. 1.

As a modification of the above described embodiment, the power management device 1 of FIG. 1 may further include a transmitting unit 30 (the transmitting unit) that is connected to the engine stop allowing/prohibiting unit 28 and transmits information to a portable terminal 40 owned by the user, as shown in FIG. 13. With this arrangement, the warning in step S11 and the notification of the estimated number of unattended days and the number of parking allowed days in step S14 can be sent to the user by the transmitting unit 30 transmitting information to the portable terminal 40, without the intervention of the navigation device 2.

Particularly, with the notification of the estimated number of unattended days and the number of parking allowed days in step 14, the user can be notified through the portable terminal 40 that the charging of the battery has not been completed, when the user exits the vehicle without making a response indicating the number of parking days.

The portable terminal 40 may be a portable telephone, a portable information terminal (such as a PDA), or a notebook computer, for example.

In a case where the battery is replaced with a new battery in the above described embodiment, the battery state determining unit 25 identifies the battery type by the above described method at the start of the engine immediately after the battery replacement, and may write the information about the identified battery type into the nonvolatile memory 5. Accordingly, the battery state determining unit 25 does not need to calculate the battery type every time the engine is started. In this case, the battery state determining unit 25 should check if there is a change in the battery history information when the engine is started. If there is a change in the battery history information, the battery state determining unit 25 should write the information about the battery type into the nonvolatile memory 5.

In a case where the battery is replaced with a new one in the above described embodiment, the dark current detecting unit 23 may detect the current value every 0.5 seconds over a predetermined period of time (10 seconds, for example) immediately after the replacement, and may set the mean value of the detected current values as the definite value of the dark current. Also, the dark current detecting unit 23 may write the definite value of the dark current into the nonvolatile memory 5. When a dark current is detected, each of the ECUs 7, 8, 10, 11, 13, and 14 should be in a sleep state. With this arrangement, an accurate dark current value can be detected, even when the battery is replaced with a new one.

In a case where the electric components other than the ECUs 7, 8, 10, 11, 13, and 14, and the power management device 1 are being driven when the ignition switch is turned off, the parking allowed days calculating unit 27 may recalculate the number of parking allowed days. If the recalculated number of parking allowed days is smaller than the number of parking days indicated in the response from the user, the engine stop allowing/prohibiting unit 28 may notify the user through the navigation device 2 that the battery 4 needs to be charged.

In the above described embodiment, the maps shown in FIGS. 6 through 10B are stored in the ROM 102. However, those maps may be stored in the nonvolatile memory 5. Also, those maps may be modified through a PC connected through the communication line 6 or the navigation device 2.

A recording medium on which a software program for realizing the functions of the above described embodiment is recorded may be provided to the power management device 1, and the computer (the CPU 101 or a microcomputer) of the power management device 1 may read and execute the program stored in the recording medium, so as to achieve the same effects as those of the above described embodiment. The recording medium for providing the program may be a CD-ROM, a DVD, or a SD card, for example.

The computer (the CPU 101 or the microcomputer) of the power management device 1 may also execute a software program for realizing the functions of the power management device 1, so as to achieve the same effects as those of the above described embodiment.

Although a preferred embodiment of the present invention has been shown and described, it would be appreciated by those skilled in the art that changes may be made in the embodiment without departing from the principles and spirit of the invention, the scope of which is defined in the claims and their equivalents.

The present invention is based on Japanese Patent Application No. 2007-111063 filed on Apr. 19, 2007, the entire disclosure of which is hereby incorporated by reference.

What is claimed is:

1. A power management device comprising:
   a calculating unit that calculates the number of parking allowed days of a vehicle, based on information about a battery state and information about a current to be consumed by the vehicle while the vehicle is parked;
   an obtaining unit that obtains a response indicating the number of parking days of a user in reply to a notification of the number of parking allowed days; and
   a control unit that causes a notifying unit to notify the user of the number of parking allowed days calculated by the calculating unit, and prohibits an engine stop until a charge amount of the battery reaches a necessary charge amount through a charging operation, when a determining unit determines that the battery needs to be charged in accordance with the number of parking allowed days and the number of parking days obtained by the obtaining unit.

2. The power management device as claimed in claim 1, further comprising
   a correcting unit that corrects the number of parking allowed days calculated by the calculating unit, based on a liquid temperature or internal resistance of the battery.

3. The power management device as claimed in claim 1, wherein, at the time of an engine stop, the control unit causes the notifying unit to notify the user of the number of parking allowed days calculated by the calculating unit and of whether the battery needs to be charged.

4. The power management device as claimed in claim 1, wherein the control unit determines whether the vehicle is to be parked for a short period of time or a long period of time in accordance with a destination of the vehicle, and, based on a result of the determination, determines whether to prohibit the engine from stopping or to allow the engine to stop.

5. The power management device as claimed in claim 1, wherein the control unit determines whether to prohibit the engine from stopping or to allow the engine to stop in accordance with a location of the vehicle.

6. The power management device as claimed in claim 1, further comprising
   an input unit that inputs a forcible engine stop instruction, wherein the control unit allows the engine to stop in accordance with the forcible engine stop instruction that is input through the input unit.

7. The power management device as claimed in claim 1, further comprising
   a sensing unit that senses a vehicle exit action, wherein, when a vehicle exit action is detected by the sensing unit after the control unit causes the notifying unit to notify the user of the number of parking allowed days, the sensing unit warns the user.

8. The power management device as claimed in claim 7, wherein:
   when the obtaining unit does not obtain a response indicating the number of parking days from the user in replay to the notification of the number of parking allowed days, and the sensing unit senses a vehicle exit action, the determining unit estimates the number of unattended days in accordance with a destination of the vehicle, and the calculating unit determines whether the battery needs to be charged in accordance with the number of parking allowed days calculated by the calculating unit and the estimated number of unattended days; and
   when the determining unit determines that the battery needs to be charged, the control unit prohibits an engine stop until the charge amount of the battery reaches the necessary charge amount through the charging operation.

9. The power management device as claimed in claim 8, further comprising
   a transmitting unit that transmits information to a portable terminal owned by the user,
   wherein, when the obtaining unit does not obtain a response indicating the number of parking days from the user in replay to the notification of the number of parking allowed days, and the sensing unit senses a vehicle exit action, the determining unit estimates the number of unattended days in accordance with the destination of the vehicle, and the transmitting unit transmits information about the estimated number of unattended days and the number of parking allowed days to the portable terminal.

10. A computer readable medium storing a program causing a computer to function as:
    a calculating unit that calculates the number of parking allowed days of a vehicle, based on information about a battery state and information about a current to be consumed by the vehicle while the vehicle is parked;
    an obtaining unit that obtains a response indicating the number of parking days of a user in reply to a notification of the number of parking allowed days; and
    a control unit that causes a notifying unit to notify the user of the number of parking allowed days calculated by the calculating unit, and prohibits an engine stop until a charge amount of the battery reaches a necessary charge amount through a charging operation, when a determining unit determines that the battery needs to be charged in accordance with the number of parking allowed days and the number of parking days obtained by the obtaining unit.

* * * * *